Sept. 17, 1968  YUKIO MIZUTA ET AL  3,401,829
CARD SORTING APPARATUS
Filed Dec. 27, 1966  2 Sheets-Sheet 1
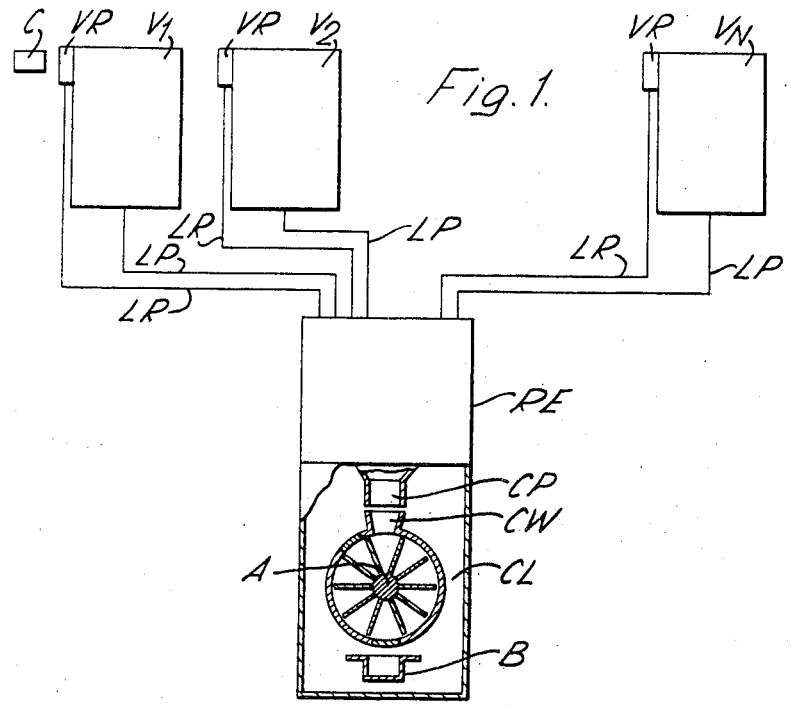
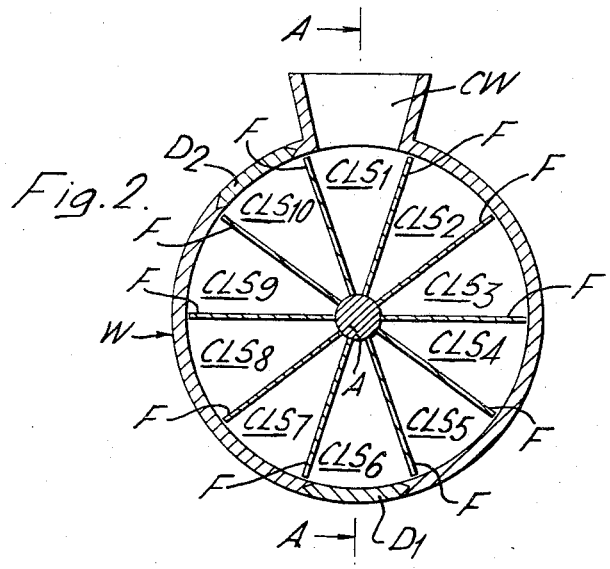
INVENTORS
YUKIO MIZUTA
TAKEO ASADA
HISAO TANAKA
SHOJI MORISHITA
ATTORNEYS United States Patent Office 3,401,829
Patented Sept. 17, 1968

3,401,829
CARD SORTING APPARATUS
Yukio Mizuta, 68–101 Ninomaru-cho, Mukojima, Fushimi-ku; Takeo Asada, 22–5 Taikoyama, Okukaiinji, Nagaoka-cho, Otokuni-gun; Hisao Tanaka, 10 Shimobanba, Kotari, Nagaoka-cho, Otokuni-gun; and Shoji Morishita, 57–9 Ishizuka-cho, Hinooka, Higashiyama-ku, all of Kyoto, Japan
Filed Dec. 27, 1966, Ser. No. 604,906
Claims priority, application Japan, Dec. 29, 1965, 40/81,870
3 Claims. (Cl. 221—2)

ABSTRACT OF THE DISCLOSURE

A system as shown in FIGURE 1 for automatically sorting credit card operated vending machine sales record cards. The customer's credit card identification number is read by the vending machine which transmits to a central recording device a signal for the customer group identification number and another signal indicating the price of the vended product or service. The recording device prints this information on record cards which are conveyed to an exit. A receptacle divided into customer group compartments includes a position signal generator for indicating which particular group compartment is in position to receive record cards from the exit. A drive system is controlled by means responsive to the group identification and position signals to position the specific compartment for receiving record cards of a specific customer group in registry with the exit.

---

This invention relates to a card sorting apparatus and, more particularly, apparatus for sorting or classifying cards such as debit notes resulting from credit sales made by automatic vending machines into predetermined different groups.

Nowadays automatic vending machines of credit card types are in wide use. In such credit sale systems, upon every credit sale made by the machine, the information such as the purchaser identification number, the price of the article sold, etc., is recorded for a debit note to be prepared and issued to the purchaser. Since many sales are made and, consequently, many debit notes must be prepared, it is desirable to have them sorted or classified as to individual customers or customers belonging to predetermined different groups or districts of residence. However, if such sorting is to be manually performed, a great amount of time and labor must be consumed, and this is particularly so if many vending machines are distributed over a wide district and or if the settlement of accounts for individual customers has to be made unperiodically. To take a hotel for example, in which each lodger is given a credit card to be used in vending machines installed at different floors or places in the hotel. In this case, different lodgers have different lodging schedules, and the statements of accounts to be issued to those who have used the vending machines must be ready for settlement upon request by any lodger at any time. If all the debit notes that have been prepared by the vending machines are mixed up and the desired ones have to be chosen among them, the time and labor involved will be great. In addition, there will be a risk of overlooking.

Accordingly, the primary object of the invention is to provide an apparatus for automatically sorting cards or the like such as debit notes prepared from the sale records of automatic vending machines of credit card types.

Other objects, features and advantages of the invention will become apparent from the following description of a preferred embodiment thereof with reference to the accompanying drawings, wherein:

FIG. 1 is a schematic view of the apparatus of the invention with the card sorting device shown having its casing wall partially cut away;

FIG. 2 is an enlarged sectional front view of the sorting box;

Let it be assumed in the illustrated embodiment that the cards to be sorted are the debit notes to be issued to purchasers of articles from automatic vending machines of a credit card type installed at different floors in a hotel; that the hotel had ten floors with one or more such vending machines installed at any one or more of the floors, and a single recording station at the first or ground floor; and that the debit notes are to be sorted into ten different groups corresponding to the ten floors the customers or purchasers lodge at.

The credit cards to be handed to the lodgers are marked with a different coded number of three figures as an identification number. For example, the card to be issued to a lodger in Room No. 10 at the first or ground floor is marked with 110, and the card to be issued to a lodger in Room No. 3 at the second floor, with 203. Thus, the figures 1 and 2 in the third place express the floor numbers the lodgers' rooms are at, while the figures 10 and 03 express their room numbers, respectively.

In FIG. 1, there are shown a plurality of credit card type of vending machines V1, V2, . . ., V$n$ installed at any one or more places in the hotel. When a purchaser inserts his or her credit card C into one of the vending machines, a card reader VR attached thereto reads the identification number of the card and produces a corresponding signal on a line LR, while the vending machine produces on a line a signal corresponding to the price of the article that has been sold.

Figure 3:
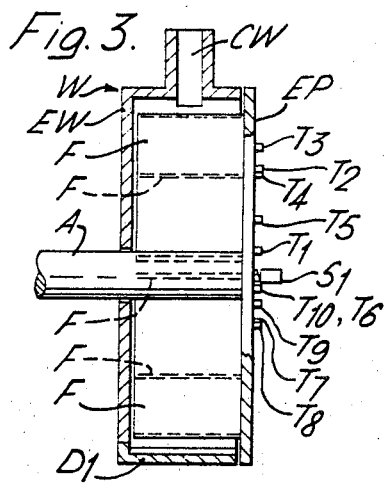
FIG. 3 is a section taken on line A—A of FIG. 2.
Figure 4:
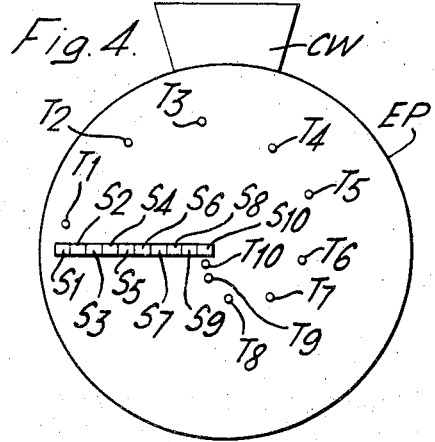
FIG. 4 is an end view of the sorting box of FIGS. 2 and 3.

At the central station, a recorder RE is provided, which receives the signals through the lines LR and LP and makes a debit note, which will be called a card hereinafter, for each sale that has been made. The card will then be sent out of an exit opening CP of the recorder into a sorter CL. As shown in FIGS. 2 to 4, the sorter CL comprises ten radial blades or vanes F rigidly planted about a shaft A connected to a drive motor M for rotation about an axis, and a generally cylindrical wall W encircling the blades. The wall is formed with an entrance opening CW positioned just below the exit opening CP of the recorder. The cylindrical wall W has its one end opening closed by a circular end plate EW integral with the wall W and its opposite end opening closed by a circular end plate EP centrally secured to the shaft A for rotation therewith. The ten radial blades F have their respective side edges fitted into the inner face of the end plate EP and equiangularly divides the whole circumferential space about the shaft A into ten compartments CLS1 through CLS10 for receiving the cards dropped from the recorder exit opening CW, as will be described later.

The wall W is formed with an axially slidable door D1 at the bottom of the wall and another similar door D2 adjacent the entrance opening CW of the sorter CL. It will be easily seen that when the door D1 is slid open, the cards contained in the compartment CLS6 just above the door drop into a receptacle B disposed just below. The upper door D2 may be opened for returning any undesired cards to the compartment.

Facing the outer surface of the rotatable end plate EP, there are ten microswitches S1 through S10 arranged in a line radial of the plate EP. The plate EP is provided with ten projections T1 through T10 spirally arranged at equal angular distance about the axis of rotation so that each of them may contact one of the microswitches for every one revolution of the plate EP and, consequently, the shaft A when each one of the ten compartments CLS1 through CLS10 faces the entrance opening CW.

Figure 5:
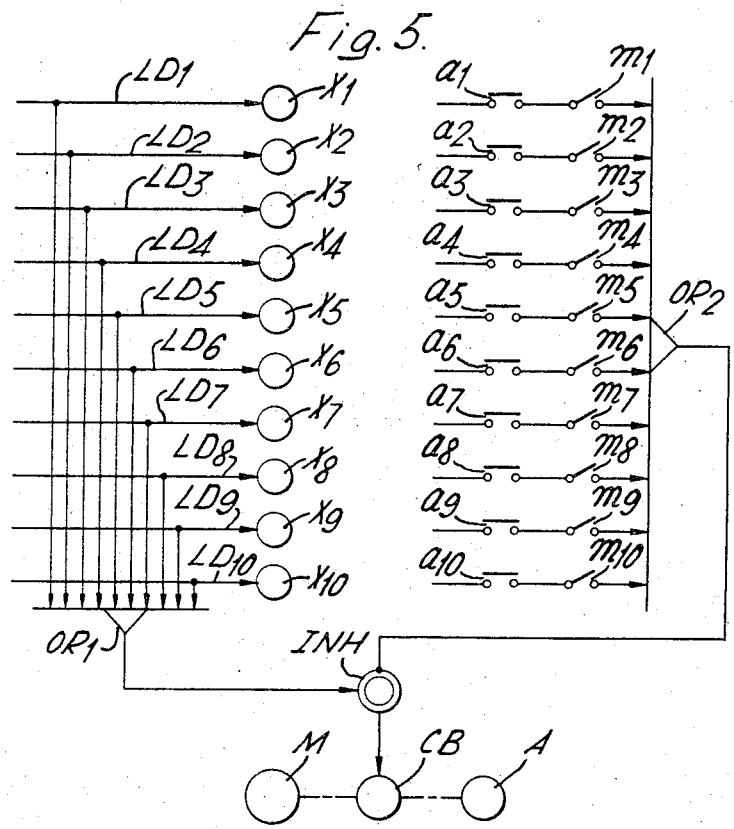
FIG. 5 is a diagram of the control circuit of the invention.

FIG. 5 shows a circuit for controlling the rotation of the shaft A. The circuit includes lines LD1 through LD10, and ten electromagnetic relays X1 through X10 connected in series with the ten lines, respectively. The mode of connection is such that when the card reader has read the figure in the third place of the customer identification number of a card inserted, that is, the figure indicating the floor number, a signal appears on the corresponding one of the ten lines LD1 through LD10. For example, if the figure in the third place of the three-figure number on an inserted card is 2, a signal appears on the line LD2, and if the figure is 5, a signal appears on the line LD5. The signal energizes the corresponding electromagnetic relay X2 or X5. The ten lines LD1 through LD10 are connected to the ten input terminals of an OR element OR1, respectively. The relays X1 through X10 have their respective contacts $a1$ through $a10$ connected in series with the ten normally open contacts $m1$ through $m10$, respectively, of the above mentioned microswitches S1 through S10. The mode of connection is such that as the ten compartments CLS1 through CLS10 of the sorter CL are successively brought just below the entrance opening CW, the contact of that microswitch which is actuated in response to that one of the ten compartments which is just positioned below the entrance opening CW, is connected in series with that one of the ten electromagnetic relays which is energized upon detection of the figure in the third place of that customer identification number which is to be printed on the card to be received in that one compartment positioned just below the entrance opening.

To put it in more concrete terms, when the card reader VR has read the customer identification number of 203 on an inserted credit card, a signal appears on the line LD2 to energize the electromagnetic relay X2, the contact $a2$ of which is connected in series with the contact $m2$ of the microswitch S2 which is closed when the compartment CLS2 has come just below the entrance opening CW so as to receive those cards which have a customer identification number in the two hundreds printed thereon.

The ten series circuits are connected to the input terminals of an OR element OR2, the output of which is applied to the inhibit terminal of an INHIBIT element INH, to the input of which is applied the output of the previous mentioned OR element OR1.

The drive motor M is energized either always or only when a credit card is inserted into the card reader of any of the vending machines. The motor rotates the shaft A through a clutch brake CB. The clutch brake is of such a type that it is provided with an electromagnetic coil, not shown, upon energization of which a drive connection is established between the motor output shaft and the shaft A, and that upon deenergization of the coil, the clutch brake CB disconnects the shaft A from the motor M, and at the same time instantly stops further rotation of the shaft A due to inertia. It will be seen that the clutch brake is controlled by the output of the INHIBIT element INH.

In operation, so long as no credit card is inserted into any of the card readers VR, there is no output from the INHIBIT element INH, so that the shaft A remains stationary. As previously mentioned, the motor M may be always rotating or not rotating. In the latter case, when a credit card is inserted into the card reader of any one of the vending machines, the motor M starts rotating. Suppose that the identification number of a credit card inserted be 203. Then, a corresponding signal is applied through the line LR to the recorder RE, in which that number 203 is printed on a card.

On the other hand, a signal appears on the line LD2 to energize the relay X2 to close its contact $a2$. The signal on the line LD2 is simultaneously applied to the OR element OR1, the output of which is applied through the INHIBIT element, which receives no inhibit signal at this time, to the clutch brake CB. This effects the drive connection between the motor M and the shaft A and, consequently, the blades F are rotated until the compartment CLS2 comes just beneath the entrance opening CW, whereupon the projection T2 presses the microswitch S2 to close its contact $m2$. As a result, the OR element OR2 produces an output, which is applied to the INHIBIT element to make its output disappear.

This deenergizes the coil of the clutch brake CB so as to terminate the drive connection, thereby instantly stopping the rotation of the shaft A to maintain the compartment CLS2 just below the entrance opening CW. About this time, the recorder RE prints on a card the customer identification number and other necessary information such as the price of the article that has been sold and drops the card into the compartment CLS2 it should be stored into.

In similar manners, the cards resulting from all the sales or purchases that have been made are sorted into the corresponding one of the compartments.

Upon request for settlement of accounts from No. 203 customer, the shaft A may be manually rotated to position the compartment CLS2 above the lower slidable door D1. Under the condition, when the door D1 is opened, all the cards contained therein drop into the receptacle B. Then, the desired card or cards bearing the customer identification number 203 may be picked up. If necessary, the shaft A may again be manually rotated to position the compartment below the upper door D2, through which the rest of the cards may be returned to the compartment.

One preferred embodiment of the invention having been illustrated and described, it should be noted that many changes and modifications may be made without departing from the scope of the invention as defined in the appended claims.

What we claim is:

1. An apparatus for sorting cards and the like comprising, in combination with an automatic vending machine of credit card type operable upon insertion thereinto of a credit card bearing a customer identification number thereon, said vending machine including means for reading the identification number of a card inserted thereinto to produce a corresponding first electrical signal and means for providing a second electrical signal corresponding to the price of an article sold or service rendered: means for receiving said first and second signals to prepare a record card for each sale and send out said card through an exit opening; means including a plurality of compartments, each predetermined one of which is adapted to receive therein those record cards which are to be sorted into the same group; means for driving said compartments relative to said exit opening; means for producing a third electrical signal when each of said compartments faces said exit opening; and means controlled by said first and third signals to control said drive means to position each of said compartments in face-to-face relation to said exit opening, so that each of said compartments receives therein those record cards which are to be sorted into the same group.

2. The apparatus as defined in claim 1, wherein said last-mentioned means comprises a first plurality of contacts each adapted to be closed when one of said compartments faces said exit opening, and a second plurality of contacts each adapted to be closed by said first signal in accordance with the identification number of a record card prepared, each of said second plurality of contacts being connected in series with that one of said first plurality of contacts which is closed when that one of said compartments in which said record card is to be received faces said exit opening; and means operable upon simultaneous closing of said serially connected first and second contacts for stopping said drive means.

3. The apparatus as defined in claim 1, wherein said fourth-mentioned means comprises a generally cylindrical housing closed at one end and open at the other and having an opening formed in the cylindrical wall in face-to-face relation to said exit opening; a shaft generally concentric with said cylindrical housing and adapted to be rotated by said drive means; a plate rigidly mounted on said shaft for rotation therewith and adapted to close said end opening of said cylindrical wall, thereby defining a space within said housing; and a plurality of blades rigidly planted on said shaft for rotation therewith and extending radially of said shaft, thereby dividing said space within said housing into said plurality of compartments around said shaft.

References Cited
UNITED STATES PATENTS

| | | | |
|---|---|---|---|
| 1,389,641 | 9/1921 | Geltz | 346—48 |
| 2,970,877 | 2/1961 | Parsons et al. | 221—2 X |
| 3,341,070 | 9/1967 | Hertrich | 221—2 X |

STANLEY H. TOLLBERG, *Primary Examiner.*